(12) United States Patent
Phillips et al.

(10) Patent No.: US 11,975,369 B2
(45) Date of Patent: *May 7, 2024

(54) APPARATUS FOR SEPARATION OF A SUBSTANCE FROM GROUNDWATER

(71) Applicant: OPEC Remediation Technologies Pty Limited, Hornsby (AU)

(72) Inventors: Steven Edward Phillips, Hornsby (AU); Gregory Raymond Brickle, Hornsby (AU); David John Burns, Hornsby (AU)

(73) Assignee: OPEC Remediation Technologies Pty Limited, Hornsby (AU)

( * ) Notice: Subject to any disclaimer, the term of this patent is extended or adjusted under 35 U.S.C. 154(b) by 1162 days.

This patent is subject to a terminal disclaimer.

(21) Appl. No.: 16/212,613

(22) Filed: Dec. 6, 2018

(65) Prior Publication Data

US 2019/0176101 A1    Jun. 13, 2019

Related U.S. Application Data

(63) Continuation of application No. PCT/AU2017/050581, filed on Jun. 11, 2017.

(30) Foreign Application Priority Data

Jun. 10, 2016    (AU) ................. 2016902280

(51) Int. Cl.
*B03D 1/24*    (2006.01)
*B01F 23/231*    (2022.01)
(Continued)

(52) U.S. Cl.
CPC ........ *B09C 1/002* (2013.01); *B01F 23/23123* (2022.01); *B03D 1/24* (2013.01);
(Continued)

(58) Field of Classification Search
CPC .... C02F 1/24; C02F 1/008; C02F 1/42; C02F 1/281; C02F 1/283; C02F 1/441;
(Continued)

(56) References Cited

U.S. PATENT DOCUMENTS

| | | | |
|---|---|---|---|
| 3,498,674 A | | 3/1970 | Matthews |
| 5,180,503 A | * | 1/1993 | Gorelick ............ B01D 19/0005 |
| | | | 210/170.07 |

(Continued)

FOREIGN PATENT DOCUMENTS

| | | | |
|---|---|---|---|
| DE | 4006435 A1 | * | 5/1991 |
| EP | 0613725 A2 | | 9/1994 |
| FR | 2364181 A | * | 5/1978 ............. A01K 63/04 |

*Primary Examiner* — Hayden Brewster
(74) *Attorney, Agent, or Firm* — Foley & Lardner LLP

(57) ABSTRACT

Apparatus is disclosed for separating an amount of a substance from groundwater, comprising an elongate chamber (18) having an inlet (22) which is arranged in use to admit groundwater into the chamber near a lower first end (24). There is also a gas sparger (26) located near the first end (24) which admits gas into the chamber for inducing groundwater to flow from the first end (24) of the chamber toward a second end upper end, and for producing a froth layer (32) which rises above an interface with the groundwater including a concentrated amount of the substance. A suction hood (38) can be moved downward from the top of the chamber (18) into a position to collapse the froth layer (32) and to cause it to be removed from the well body (14). The suction hood (38) (acting as a froth depth regulation device) controls the amount of groundwater in the froth layer (32), which influences the concentration of the contaminant substance achieved in the froth layer (32).

18 Claims, 10 Drawing Sheets

(51) Int. Cl.
  *B09C 1/00* (2006.01)
  *C02F 1/00* (2023.01)
  *C02F 1/24* (2023.01)
  *C02F 1/28* (2023.01)
  *C02F 1/42* (2023.01)
  *E21B 43/12* (2006.01)
  *E21B 43/38* (2006.01)
  *B01F 23/237* (2022.01)
  *C02F 1/44* (2023.01)
  *C02F 101/36* (2006.01)
  *C02F 103/06* (2006.01)

(52) U.S. Cl.
  CPC ............... *B09C 1/005* (2013.01); *B09C 1/007* (2013.01); *C02F 1/008* (2013.01); *C02F 1/24* (2013.01); *C02F 1/42* (2013.01); *B01F 23/231261* (2022.01); *B01F 23/237612* (2022.01); *B01F 23/237613* (2022.01); *B09C 2101/00* (2013.01); *C02F 1/281* (2013.01); *C02F 1/283* (2013.01); *C02F 1/441* (2013.01); *C02F 2101/36* (2013.01); *C02F 2103/06* (2013.01); *C02F 2209/38* (2013.01)

(58) Field of Classification Search
  CPC .............. C02F 2101/36; C02F 2103/06; C02F 2209/38; B01F 23/23123; B01F 23/231261; B01F 23/237612; B01F 23/237613; B03D 1/24; B09C 1/002; B09C 1/005; B09C 1/007; B09C 2101/00; E21B 43/122; E21B 43/38
  USPC ...................................................... 210/221.2
  See application file for complete search history.

(56) References Cited

U.S. PATENT DOCUMENTS

| | | | |
|---|---|---|---|
| 5,389,267 | A | 2/1995 | Gorelick et al. |
| 6,284,133 | B1* | 9/2001 | Schaefer ................... B09C 1/10 |
| | | | 210/170.07 |
| 11,358,103 | B2* | 6/2022 | Phillips ................... E21B 43/38 |
| 2007/0278144 | A1* | 12/2007 | Wong ..................... B01D 19/02 |
| | | | 210/167.26 |
| 2014/0246366 | A1 | 9/2014 | Kefoot |
| 2019/0263679 | A1* | 8/2019 | Phillips ................... C02F 1/008 |

* cited by examiner

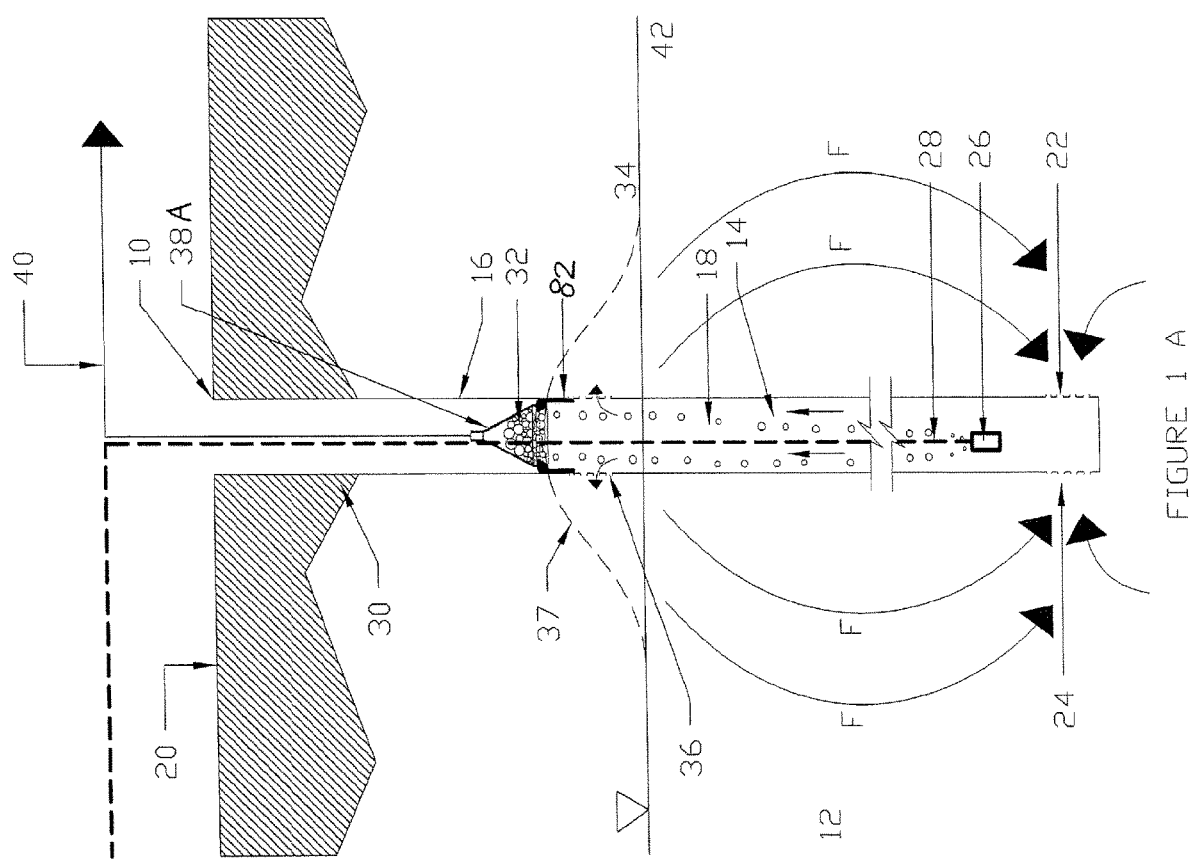

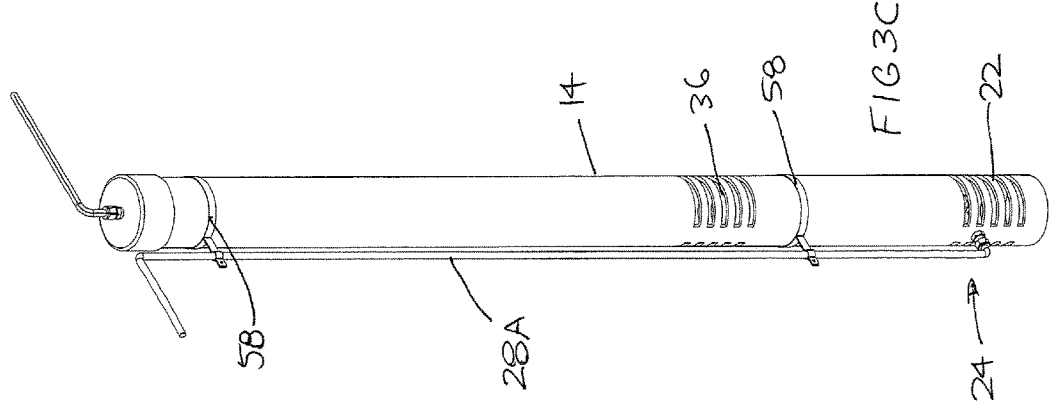
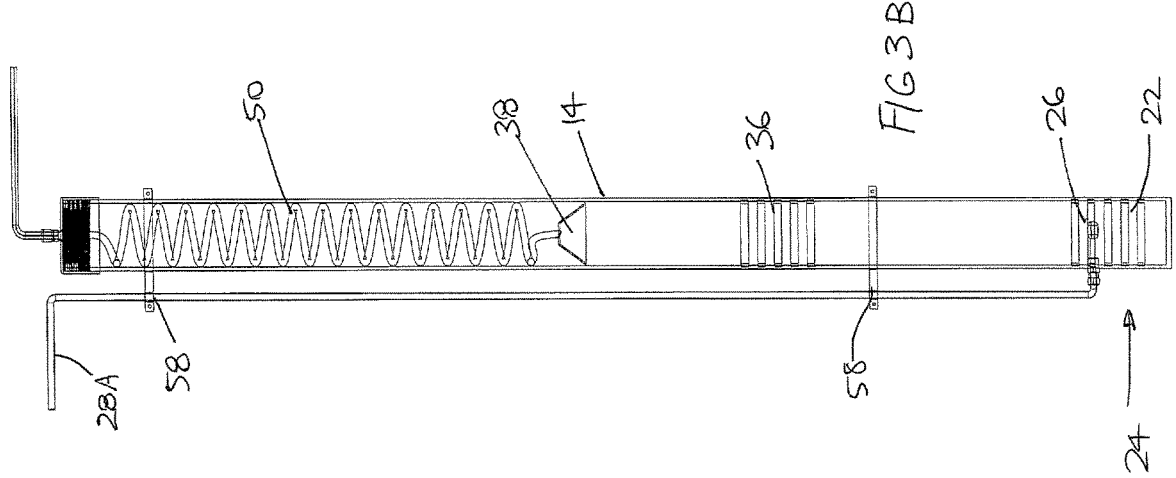
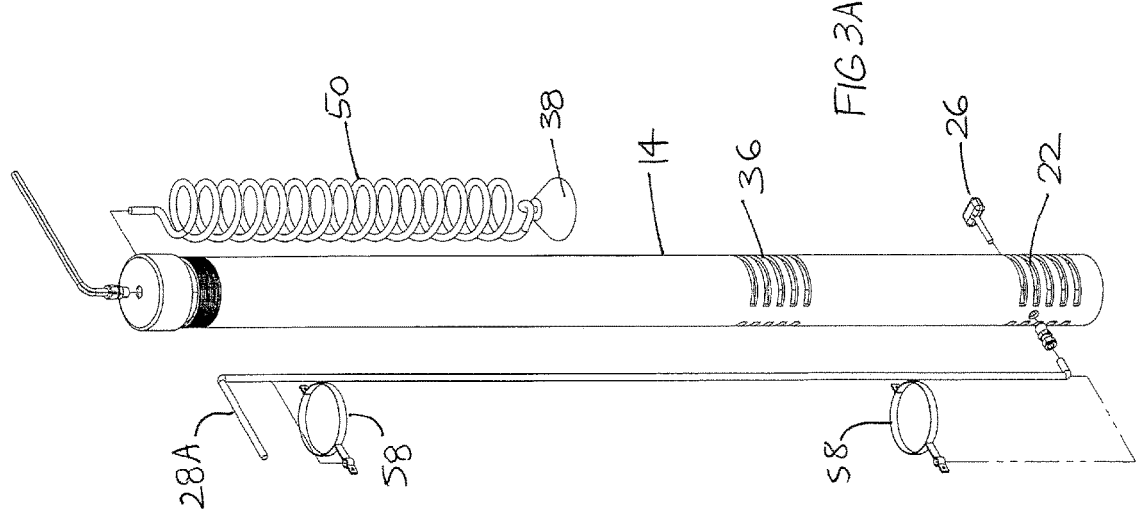

SECTION A-A

APPARATUS FOR SEPARATION OF A SUBSTANCE FROM GROUNDWATER

TECHNICAL FIELD

This disclosure relates to an apparatus for separation of a substance from groundwater and to a method for use of the separation apparatus. In one form, the apparatus and method can be applied to removal of contaminant organic material present in groundwater which is located in a body of ground. However, the apparatus and method can also be applied to the removal of non-organic materials or contaminants from groundwater.

BACKGROUND OF THE DISCLOSURE

Perfluoroalkyl or polyfluoroalkyl substances (PFAS) embody a range of poly fluorinated alkyl substances (including but not limited to carboxylic acids, alkyl sulfonates, alkyl sulfonamido compounds and fluoro telemeric compounds of differing carbon chain lengths and precursors of these). PFAS have found use in a wide variety of applications including as a specialised fire-fighting product, or for impregnation or coating of textiles, leather and carpet, or for carpet cleaning compounds, as well as in aviation hydraulic fluids, metal plating, agricultural (insect traps for certain types of ants), photo-imaging, electronics manufacture and non-stick cookware applications.

Higher order PFAS degrade to specific end-point PFAS chemicals (including but not limited to perfluorooctane sulfonate (PFOS), perfluorooctanoic acid (PFOA) and perfluorohexane sulfonate (PFHxS). These priority compounds of concern are resistant to biotic or abiotic degradation and thus are persistent in the environment. They are recalcitrant, bio-accumulative and known to have contaminated soils, groundwaters and drinking water supplies.

PFAS are known to have contaminated groundwater, including drinking water supplies. PFOS, PFHxS, and PFOA have published human health and environmental regulatory criteria in most developed world jurisdictions. Additional PFAS compounds are expected to be identified as contaminants of concern as new research toxicology data indicates potential risk associations. Remedial methods are needed to treat priority PFAS compounds.

Technology used to remove volatile organic compounds (VOC) by bubbling air through groundwater or in groundwater wells (also known as "air stripping") is known in a number of publications. However, it is also known that such techniques do not work to treat groundwater with PFAS contamination. In a recent study, data is presented from a US location contaminated by PFAS where air-stripping had been previously used to remove VOCs, but more than 25 years after that activity, the site under investigation still had high, persistent PFAS contamination requiring remediation (Environ. Sci. Pollut. Res (2013) 20:1977-1992pp). While they are soluble, most long-chain PFAS (including PFOS and PFOA have a low, to very low, vapour pressure, which means they do not volatilise easily, so air-stripping is therefore not an ineffective remedial treatment.

Known technology used to treat PFAS contaminated groundwater is based on two approaches: "pump and treat" and "in-situ chemical treatment".

"Pump and treat" is a conventional approach of pumping groundwater via extraction wells drilled into the ground to the surface, then treating the collected water. The treated water is then directed toward a suitable endpoint, for example for irrigation or re-injection back into the ground (which in many locations is not permissible), or by disposal into a sewerage or a waste treatment facility. This technique is costly because of the expense of transporting large quantities of water from place to place.

In such an approach, there are a wide variety of technologies used by waste facilities to treat water containing PFAS, including any or a combination of the following: (a) absorption by passage through activated carbon media, most commonly in the form of granular activated carbon (GAC); (b) absorption by passage through a clay based media; (c) filtration by reverse osmosis (RO) membranes, and (d) absorption by passage through ion exchange resin. In general, the treatment agents used in these technologies cannot be easily regenerated and require disposal (typically to landfill) after they have reached maximum capacity.

Pump and treat systems are usually required to operate for extended periods over many years, and the treatment volumes are very large—as a result, the treatment plant equipment is also large. Capital and operating costs are typically high due to treatment plant size and long operational time periods (years, or even decades). The other difficulty is that contaminants can be absorbed onto non-permeable materials in the ground (for example, onto silt or clay), and may never be properly released.

"In-situ chemical treatment" typically involves sub-surface application of a reactive agent which denatures or neutralises the target contaminant (PFAS). Subsurface application of the agent may include direct injection as a concentrated liquid, slurry or gas, or excavation/construction of a sub-surface barrier wall. The reactive agent may be oxidising (for example, hydrogen peroxide, persulfate or permanganate), reductive (for example, zero valent iron) or adsorptive (for example, superfine GAC slurry, clay). However, PFAS are recalcitrant, and laboratory studies have found limited success with performance of these reagents. Laboratory studies have also found that adsorption of PFAS by GAC is reversible (that is, not permanent).

Groundwater wells are known in the art to allow the circulation below the subsurface by moving groundwater using pumping methods within a well chamber. Such wells can involve complex, multiple screen sections in side walls, which may need to be separated by packers or low permeability barriers. Traditionally such wells have been used to treat groundwater containing volatile compounds, followed by vapour extraction, or to oxygenate the ground which surrounds a well, for example for purposes of in-situ aerobic bioremediation, or to introduce other liquid or colloidal substances into the groundwater.

It has become apparent that there are no suitable technologies which overcome the cost and scale disadvantages of pump and treat remediation. It has also become apparent that in-situ chemical treatment to neutralise PFAS has yet to be successfully proven, and this process poses other environmental risks due to the presence of residual substances and their effects on subsurface media.

SUMMARY

In a first aspect, there is provided a method of separating an amount of a substance from groundwater that is present in a body of ground, the method comprising the steps of: introducing a flow of gas into a vertical well containing groundwater, the well being at least partially located within the ground, and the groundwater in the well in fluid communication with the groundwater located outside of a lower portion of the well; wherein the introduced gas induces an upward flow of groundwater in the well, and produces a froth layer which rises above an interface with the groundwater in an upper portion of the well, the froth layer including a concentrated amount of the substance; and controlling the groundwater content of the froth layer produced in the upper portion of the well to influence the concentration of the substance therein.

In certain embodiments, the upward flow of gas and the production of the froth layer is continuous. The operation can also be conducted in batch mode for specific treatment situations.

In certain embodiments, the induced upward flow of groundwater located in the well draws further groundwater into the lower portion of the well, and so it is then subjected to the substance separation method.

In certain embodiments, the groundwater located in the upper portion of the well below the froth layer is also in fluid communication with the groundwater located outside of the well. In one form of this, the induced upward flow of groundwater located in the well causes the groundwater located in the upper portion of the well, below the froth layer, to flow back into the ground surrounding the upper part of the well, which is then drawn downward to migrate to the fluid inlet at the lower portion of the well, and creating a circulation pattern in the ground to irrigate, or elutriate, the contaminant molecules from groundwater contained in the pore spaces and fractures of the subsurface, as well as in locations where the molecules are absorbed onto particle surfaces.

In an alternative form, the groundwater leaving the upper portion of the well does not enter the ground directly in that location, and can be directed via conduits or other fluid communication devices or conduits to travel to another location where it can re-enter the ground. This is useful in situations where the groundwater well extends through a layer of uncontaminated earth in order to reach a semi-confined aquifer below which is contaminated with PFAS. It is undesirable in such situations to return treated groundwater which may still contain some level of residual contaminant as it is exiting the elongate chamber of the well, into an uppermost ground layer which is initially entirely uncontaminated. In other situations, it may not be physically possible to take groundwater for treatment out of semi and confined aquifers and then try to release it for circulation to occur through an aquitard or aquiclude. For these reasons a number of different routes for the treated groundwater to be placed in fluid communication with, and returned to, the zone of initial contamination are contemplated.

In certain embodiments, the upward flow of gas is introduced into a lower portion of the well, although of course it is possible for gas to also be introduced at several positions along the well depth.

In certain embodiments, the step of controlling the groundwater content of the froth layer in the upper portion of the well is by at least one of the group comprising: controlling a physical parameter of the flow of introduced gas; and controlling a physical parameter of the froth layer.

In one form of this, the step of controlling a physical parameter of the flow of introduced gas comprises use of a flow controller and an inlet valve for controlling the flow of said introduced gas into the well. If too much gas is introduced into the well, the flow of groundwater can move away from its ideal treatment condition of quiescent flow, and instead become turbulent. In turbulent situations, the froth layer can become disrupted and can also become very wet and thus cause dilution of the concentration of the substance that is being removed from the groundwater.

In certain embodiments, the step of controlling a physical parameter of the flow of introduced gas comprises use of a bubble generation device located prior to or at the point when said introduced gas enters the groundwater located in the well. Bubble generation devices can include air bubblers (or equivalent nomenclature such as spargers, frits, aerators, aeration diffusers, air stones and the like) located within the well and in contact with the groundwater. Another type of bubble generation device can involve inducing air into a flow of groundwater passing through a venturi expander for example, to create fine air bubbles in situ, and then passing this aerated flow into the well.

In certain embodiments, the step of controlling a physical parameter of the froth layer comprises use of a froth depth regulation device for maintaining the depth of said froth in the well. In one form of this, the froth depth regulation device is selected from the group comprising: a device which is moveable within the well in response to movement of the location of the interface; and a device which is arranged at a fixed location within the well, and the location of the interface is responsive to the flow of the introduced gas.

Those froth depth regulation devices which are moveable within the well in response to movement of the location of the interface have the advantage of operating with a constant depth of froth layer which is known to give adequate froth layer drainage characteristics. Such devices are arranged to be buoyant, and to be self-locating at the groundwater/froth layer interface irrespective of the overall level of groundwater in the well.

Froth depth regulation devices which are arranged at a fixed location within the well require constant adjustment of the location of the interface, which is readily changed by altering, for example, the flow of the introduced gas. A liquid level sensor can signal whether the in-well groundwater height is too high or too low, and control the flow of the introduced gas to in turn induce more groundwater to be drawn up into the well, as well as displacing an amount of the groundwater to raise the static height of the water level in the well to a desirable dynamic (operating) height and a depth of froth layer which is known to give adequate froth layer drainage characteristics.

In certain embodiments, the step of controlling a physical parameter of the froth layer further comprises use of a device for confining the cross-sectional flow path of the froth in the well, resulting in drainage of said froth layer. Apparatus which is shaped to confine or squeeze a rising froth layer can cause additional drainage of the froth layer, and may include changes to the cross-sectional open area of froth flow, for example by the use of froth crowders, narrow necked passages or channels or capillaries, tapered funnels, weir skimmers, for example.

In certain embodiments, the method further comprises the step of removal of at least some of the froth layer from the upper portion of the well. This step may be done intermittently rather than on a continuous basis, for example in batch style operations.

In certain embodiments, the froth layer is collapsed during its step of removal from the upper portion of the well, and prior to a secondary treatment step. In one form, the froth layer is removed by using mechanical apparatus from the group comprising: a foam breaker, a vacuum extraction device, and a froth extraction head.

In certain embodiments, the secondary treatment step for treating the collapsed froth layer, including the concentrated substance, uses at least one of the processes of the group comprising: absorption (using activated carbon, clay, or ion exchange resins), filtration (using reverse osmosis membranes); and introduction of further quantity of gas into a separate containment apparatus to produce another froth layer comprising a further concentrated amount of the substance, this latter step being essentially a repeat of the concentration step which took place in the groundwater well, in order to further reduce the volume of concentrate which needs to be transported from the treatment site, or otherwise treated.

Alternatively to this, in a further embodiment, the method comprises the steps of: collapsing at least some of the froth layer; and then subjecting the collapsed froth layer to a secondary treatment step, where all such steps are conducted in the upper portion of the well. In some places, environmental restrictions mandate that water taken out of the ground cannot be treated above-ground and then returned back to the immediate area of ground, which means that the groundwater portion of any contaminant concentrate, even if successfully decontaminated, cannot be reused on the site, but must be transported away. Therefore, it is useful to perform as many treatment steps within the physical confines of the groundwater well as is feasible.

In certain embodiments of this method, the step of collapsing at least some of the froth layer is by using mechanical apparatus from the group comprising: a foam breaker, a vacuum extraction device, and a froth extraction head. In certain embodiments of this, the secondary treatment step for treating the collapsed froth layer including the concentrated substance uses at least one of the absorption, filtration or froth concentration processes defined earlier. In certain embodiments of the method, after the secondary treatment, what remains of the treated froth layer is removed from the upper portion of the well.

In certain embodiments of the method, the substance is organic. In one form of this, the organic substance is at least one of a perfluoroalkyl or polyfluoroalkyl substance (PFAS). In other particular forms of this, the perfluoroalkyl or polyfluoroalkyl substance includes one or more of the group comprising: perfluorooctane sulfonate (PFOS); perfluorooctanoic acid (PFOA); perfluorohexane sulfonate (PFHxS); poly fluorinated carboxylic acids, alkyl sulfonates and alkyl sulfonamido compounds; and fluorotelemeric compounds, each having differing carbon chain lengths; and including precursors of these.

In a second aspect, there is provided apparatus for separating an amount of a substance from groundwater that is present in a body of ground, the apparatus comprising: an elongate chamber, the chamber having an inlet which is arranged in use to admit groundwater from the ground into the chamber at a region located near a first end of the chamber; and a gas introduction device located in region of the chamber near the first end which in use admits gas into the chamber, the introduced gas for inducing groundwater to flow from a region near the first end of the chamber toward a second end thereof, and for producing a froth layer which rises above an interface with the groundwater including a concentrated amount of the substance; wherein in use the apparatus is arranged to contain the froth layer near the second end of the chamber, and to control the groundwater content of the froth layer, to influence the concentration of the substance therein.

In certain embodiments, the apparatus also has an outlet which is arranged in use for egress of groundwater into the ground from the chamber at a region closer to a second opposite end of the chamber to the first end.

In certain alternative embodiments, the apparatus also has an outlet which is arranged in use for egress of groundwater, the outlet being located in the chamber at a region closer to a second opposite end of the chamber than to the first end, but wherein the said outlet is not in fluid communication with the ground outside the chamber at that said region.

In one form of this, the said outlet is in fluid communication with the ground around the chamber at a region closer to the first end thereof. In one form of this, the said outlet from the chamber comprises a fluid conduit extending therefrom arranged in use to carry a flow of groundwater for discharge into the ground. In one particular arrangement, the fluid conduit comprises a concentric annular cylinder arranged around the exterior wall of the elongate chamber.

In certain embodiments, the froth layer is located above the outlet.

In certain embodiments, the gas introduction device is positioned in use in the chamber at or above the height of the inlet.

In certain embodiments, the inlet and the outlet are arranged to exclude solid ground matter from accessing the chamber during movement of the groundwater. For example, the chamber wall may have relatively large slotted openings therein to allow ingress and egress of groundwater, but these openings are typically covered by a material with finer access holes, such as a screen barrier, a grill, filter sock and a mesh, to prevent solid ground material from entering the elongate chamber of the well casing.

In certain embodiments, the flow of introduced gas into the chamber is controlled by a flow controller and an inlet valve on a gas delivery line, responsive to a measurement of one of the group comprising: the groundwater content of the froth layer; and the location of the interface.

In certain embodiments, a bubble generation device is located prior to or at the point when the flow of introduced gas enters the groundwater located in the chamber.

In certain embodiments, a froth depth regulation device is arranged in the chamber in use for maintaining the depth of the froth above the interface. In certain embodiments, the froth depth regulation device is selected from the group comprising: a device which is moveable within the chamber in response to movement of the location of the interface; and a device which is arranged at a fixed location within the chamber, and the location of the interface is responsive to the flow of the introduced gas.

In certain embodiments, the froth depth regulation device is arranged for confining the cross-sectional flow path of the froth in the chamber, resulting in froth confinement and drainage of said froth layer. Apparatus which is shaped to confine or squeeze a rising froth layer can cause additional drainage of the froth layer, and may include changes to the cross-sectional open area of froth flow, for example by the use of froth crowders, narrow necked passages or channels or capillaries, tapered funnels, weir skimmers, for example.

In certain embodiments, the apparatus further comprises a froth layer removal device in which at least some of the froth layer is collapsed during removal of at least some of the froth layer from the second end of the chamber, and prior to a secondary treatment step. In one form, the froth layer removal device includes mechanical apparatus from the group comprising: a foam breaker, a vacuum extraction device, and a froth extraction head.

In certain embodiments, the apparatus comprises a secondary treatment device in use for treating the collapsed froth layer for removal of the concentrated substance, wherein the treatment device includes at least one of the group comprising: absorption (using activated carbon, clay, or ion exchange resins), filtration (using reverse osmosis membranes); and introduction of further quantity of gas into a separate containment apparatus to produce another froth layer comprising a further concentrated amount of the substance, this latter step being essentially a repeat of the concentration step which took place in the groundwater well, in order to further reduce the volume of concentrate which needs to be transported from the treatment site, or otherwise treated.

Alternatively to this, in a further embodiment, the apparatus comprises a froth layer treatment device wherein in use, at least some of the froth layer is collapsed using a mechanical apparatus, and then the collapsed froth layer is subjected to a secondary treatment device for removal of the concentrated substance, all said apparatus being housed within the upper portion of the chamber, for the advantages already previously recited in relation to the method of use of the apparatus.

In certain embodiments, the froth layer is collapsed using a mechanical apparatus from the group comprising: a foam breaker, a vacuum extraction device, and a froth extraction head. In certain embodiments, the secondary treatment device for treating the collapsed froth layer including the concentrated substance uses at least one of the absorption, filtration or froth concentration processes defined earlier. In certain embodiments of the method, after the secondary treatment, what remains of the treated froth layer is removed from the upper portion of the well.

In certain embodiments, the froth layer treatment device further includes a removal device via which what remains of the treated froth layer after the secondary treatment is removed from the upper portion of the chamber. This removal device may be operated intermittently rather than on a continuous basis, for example in batch style operations (for instance, activating a suction pump intermittently to remove a quantity of collapsed froth layer liquid from a reservoir).

In a third aspect, there is provided a froth depth regulation device which is suitable for use with the groundwater substance separation apparatus of the second aspect, the device comprising: a main body which is positioned in use within the elongate chamber of the said apparatus, the main body including a cavity having an open mouth which is arranged in use to face downwardly into the elongate chamber such that the open mouth receives a froth layer which rises within the elongate chamber above an interface with the groundwater; an outer circumference of either the open mouth or an exterior surface of the main body being sized so as to have a close facing relationship with the interior circumferential wall of the elongate chamber such that the froth layer is substantially directed into the open mouth; and the main body cavity having an uppermost in use exit opening of narrower width than the open mouth via which the froth layer travels or is removed from the froth depth regulation device for further processing.

In this aspect, and throughout this specification, the term "close facing" means two closely cooperating surfaces of similar surface shape, but spaced apart functionally to allow a small gap between the interior wall of the elongate chamber and an outer periphery of the body of the froth regulation device. This gap will be necessary to let the vacuum suck in ambient air from the upper areas of the elongate chamber and draw the froth up toward the froth depth regulation device.

In certain embodiments, the main body is moveably positionable in use within the elongate chamber in response to movement of the location of the interface, thereby maintaining the depth of the froth layer above the interface. In one form of this, the main body is fitted with one or more buoyancy elements which cause the device to float at the interface, to provide an optimal distance between the mouth and the interface.

In certain embodiments, the cavity has an internal shape which tapers inwardly when moving from the region of the open mouth toward the exit opening to facilitate froth layer crowding and drainage or collapse. In other forms, depending on the application, the length of the cavity within the body of device can be of various sizes to modify the distance between the interface and the exit opening. The greater the distance the exit opening is away from the froth layer is a further way of adjusting how dry the froth can be, by drainage and exclusion of groundwater which can dilute the PFAS concentration in the froth. In still further embodiments, there may be a number of froth depth regulation devices having various shapes of open mouths, and/or various different internal cavity shapes, with those multiple devices spaced across the width of the elongate chamber, in situations where larger diameter groundwater wells are contemplated.

In certain embodiments of the device, at the region of the open mouth there is a circumferential skirt which depends from the main body and in use extends downwardly into the groundwater in the elongate chamber below the froth layer interface, and arranged of a sufficient length to align with, and block the outlet in the wall of the elongate chamber used for egress of groundwater into the ground from the chamber, in operating circumstances where the interface is vertically aligned with said outlet. In one form of this, the skirt has a cross-sectional profile which tapers inwardly when moving from an outermost rim thereof toward the region of the open mouth where the skirt depends from the main body, to facilitate froth layer crowding and drainage or collapse.

In certain embodiments, the uppermost in use exit opening from the cavity extends to a region located above the main body which is arranged for receiving and retaining an amount of a collapsed froth which has been confined and drained during its passage through the cavity. In one form of this, the region comprises an enclosed reservoir having an outlet conduit partially extending thereinto, to provide fluid communication between the collapsed froth and an actuatable removal device or secondary treatment device.

In a fourth aspect, there is provided a method of separation of an amount of a substance from groundwater located in a body of ground, the method comprising the steps of arranging a plurality of the apparatus defined in the second aspect at least partially into the body of ground, followed by the steps of separating the substance from the groundwater as defined in the first aspect.

In certain embodiments, the step of arranging a plurality of the apparatus into the body of ground includes spacing the respective apparatus apart from one another in an array across an area of ground which has groundwater which is contaminated by the substance.

In a fifth aspect, there is provided a system for separating an amount of a substance from groundwater that is present in a body of ground, the system comprising: an elongate chamber which is at least partially located in the ground, an interior of the chamber being in fluid communication with the groundwater in the ground, wherein in use, groundwater enters the chamber; a gas introduction device arranged at the interior of the chamber wherein, in use, a flow of an introduced gas is placed in fluid communication with groundwater located in the chamber, thereby inducing a generally upward flow of said groundwater within the chamber and producing a froth layer which rises above an interface with the groundwater, the froth layer including a concentrated amount of the substance; and an apparatus positioned above the interface and arranged in use to control the groundwater content of the froth layer, to influence the concentration of the substance therein.

In certain embodiments, the apparatus used to control the groundwater content of the froth layer is moveable within the elongate chamber in response to movement of the location of the interface.

In one form of this, the apparatus used to control the groundwater content of the froth layer is buoyant and is arranged to float a fixed distance above the interface, so that the froth depth between the interface and the apparatus is constant. In another form, the position of the apparatus is moveable by raising and lowering it within the elongate chamber in response to signals from a sensor which indicates the depth of the groundwater and therefore the position of the interface.

In an alternative form, the apparatus used to control the groundwater content of the froth layer is arranged at a fixed location within the elongate chamber, and the location of the interface is adjustable responsive to the flow of the introduced gas, so that the froth depth can be stably positioned relative to the apparatus. In one particular embodiment, the apparatus used to control the groundwater content of the froth layer comprises a flow controller and an inlet valve on a gas delivery line for controlling the flow of the introduced gas. In another particular embodiment, the apparatus used to control the groundwater content of the froth layer further comprises a bubble generation device located prior to or at the point when the flow of introduced gas in the gas delivery line enters the groundwater located in the chamber.

In certain embodiments, the apparatus used to control the groundwater content of the froth layer further comprises a device for controlling a physical parameter of the froth layer. In one form of this, the said device controls the cross-sectional flow path of the froth in the chamber, resulting in froth confinement and drainage. Apparatus which is shaped to confine or squeeze a rising froth layer can cause additional drainage of the froth layer, and may include changes to the cross-sectional open area of froth flow, for example by the use of froth crowders, narrow necked passages or channels or capillaries, tapered funnels, weir skimmers, for example.

Other aspects, features, and advantages will become further apparent from the following detailed description when read in conjunction with the accompanying drawings which form a part of this disclosure and which illustrate, by way of example, principles of the inventions disclosed.

DESCRIPTION OF THE FIGURES

The accompanying drawings facilitate an understanding of embodiments of the apparatus, system and method of the disclosure.

FIG. 1A shows a schematic side, sectional, elevation view of a vertical well located in a body of ground, with apparatus located in the well for use in separating an amount of a substance from groundwater that is present in the body of ground, including a froth depth regulating device which is moveable within the well, in accordance with a further embodiment of the present disclosure;

FIG. 1B shows a schematic side, sectional, elevation view of a vertical well located in a body of ground, with apparatus located in the well for use in separating an amount of a substance from groundwater that is present in the body of ground, including a froth depth regulating device which is arranged at a fixed location within the well, in accordance with a further embodiment of the present disclosure;

FIG. 3A shows a schematic, exploded, perspective view of a vertical well casing, air inlet tube and moveable froth depth regulating device, all being component parts for location in a ground well, in use for separating an amount of a substance from groundwater that is present in the body of ground, in accordance with a further embodiment of the present disclosure;

FIG. 3B shows a schematic side, sectional, elevation view of an assembly of the component parts of FIG. 3A;

FIG. 3C shows a schematic perspective view of the assembly of the component parts of FIG. 3B;

DETAILED DESCRIPTION

Figure 1:
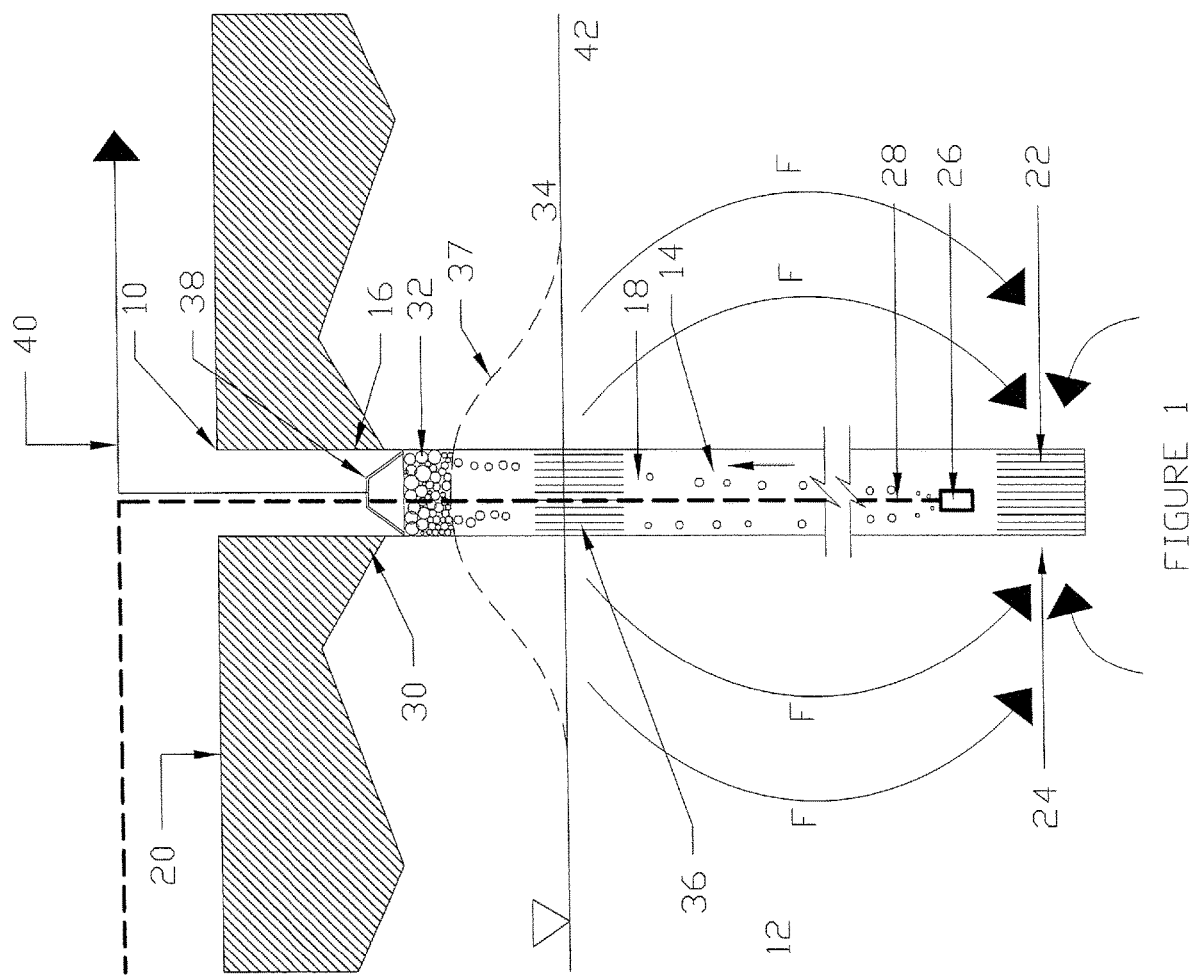
FIG. 1 shows a schematic side, sectional, elevation view of a vertical well located in a body of ground, with apparatus located in the well for use in separating an amount of a substance from groundwater that is present in the body of ground, including a froth depth regulating device which is moveable within the well, in accordance with one embodiment of the present disclosure.
Figure 1:
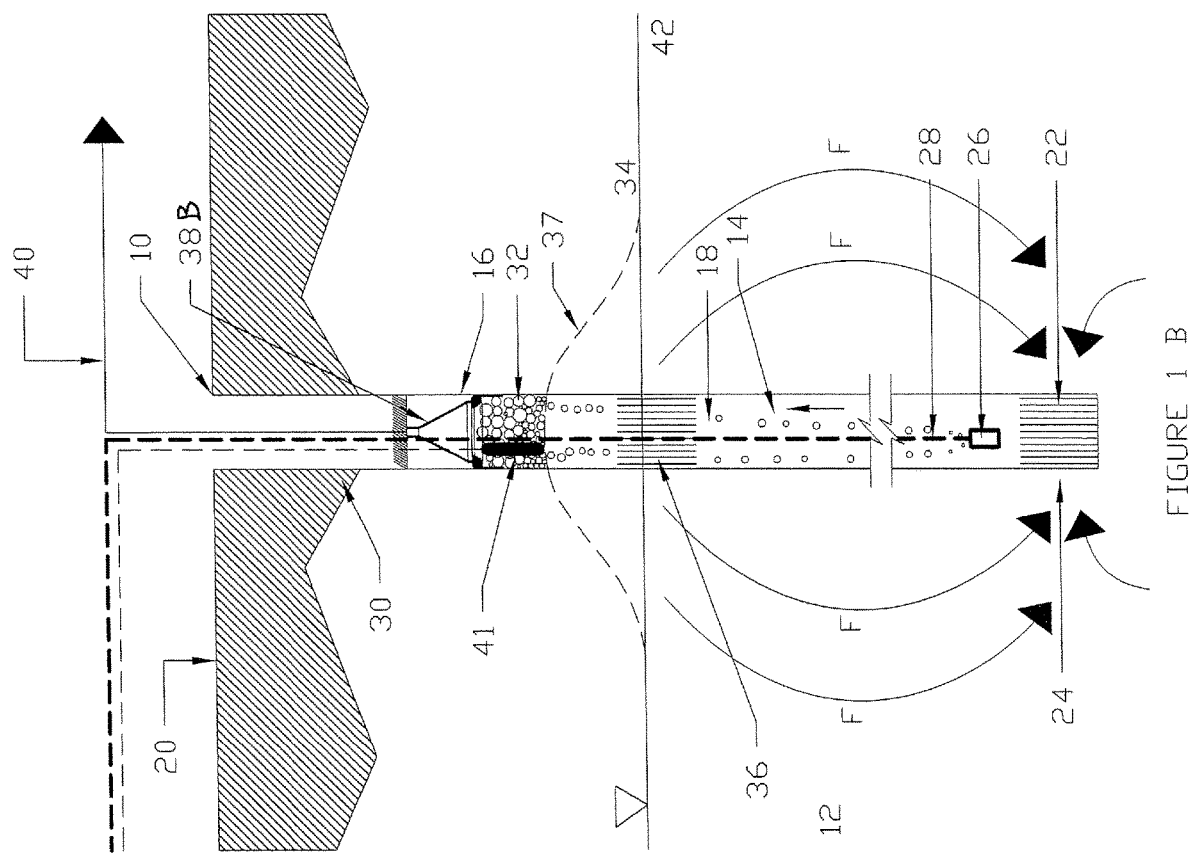

This disclosure relates to the features of a groundwater well 10 and its use for removal of an organic contaminant from the surrounding ground 12, for instance in an unconfined or a semi-confined aquifer. Referring to the embodiment disclosed in in FIG. 1, the well body 14 is in the form of an elongate, cylindrical column 16 having an interior chamber 18. The well body 14 is circular in cross-section and is positioned within the ground 12, below the ground surface level 20. The well body 14 can be a tube or column casing 16 which is made of hard plastic or metal sufficient to withstand the hydraulic pressure at depths into the ground, and sufficiently structurally sound so that it will not collapse or corrode. In one example, the column 16 has an internal bore of 150 millimetres and reaches an overall depth below the ground surface level 20 of 5 metres, although these dimensions are exemplary only, and depend on the particular site being treated.

The chamber 18 has a screened inlet which is arranged to admit groundwater from the ground 12 into the chamber 18 near the lowermost in use end 24 of the well body 14, when it is located in the ground 12. In the embodiment shown, the inlet is in the form of a series of slots or slits 22, arranged in the outer casing wall of the well body 14 at its lowermost end 24, and each slot oriented parallel to the elongate axis X-X of the well body 14. These slots 22 are constructed to permit the through flow of liquid therethrough in use, and are fitted with a screen or some other type of perforated cover arranged to exclude sediment and solid ground matter from entry into the chamber 18 once the well body 14 has been inserted into the ground 12, during flow movement of the groundwater into the well. While in one form the slots 22 may be made very fine in width so as to exclude larger particulates, in other forms the slots 22 can also be fitted with a screen, filter sock, mesh, fine grill or other barrier located on its interior or exterior surface and adjacent to and facing the slots 22, so as to prevent the entry of fine particles into the chamber 18.

The screens, filter socks and the like which are selected for installation at openings into each chamber depend on various factors including the grain size distribution of the sediments in the surrounding subsurface and the desired groundwater flow rates into and out from the chamber. The length and location of the inlet and outlet screens at each well is determined by the hydrogeological characteristics of the subsurface. Generally, it is expected that the inlet screens will be located at or near the lowermost end 24 of the well body 14, although the outlet screens can be arranged at various vertical height locations, as will be described.

The chamber 18 also has a gas introduction device in the form of a sparger 26 or bubbler (typically made of a sintered metal or from a ceramic material) which is located in the chamber 18 near the lowermost in use end 24. The sparger 26 is suspended around the centreline axis X-X of the well body 14, and is connected to a gas supply line 28 which can be a pipe which is fitted to extend from above the ground surface level 20 along an interior wall of the chamber 18. In other embodiments, for example as shown in FIGS. 3, 3A, 3B and 3C, the gas supply line can be a pipe 28A that is positioned to extend from above the ground surface level 20 along the length of the exterior of the well body 14, and arranged to access the chamber 18 at or near the lowermost end 24 of the well body 14. In that example, the pipe 28A is joined to the casing of the well body 14 by means of brackets 58.

Figure 3:
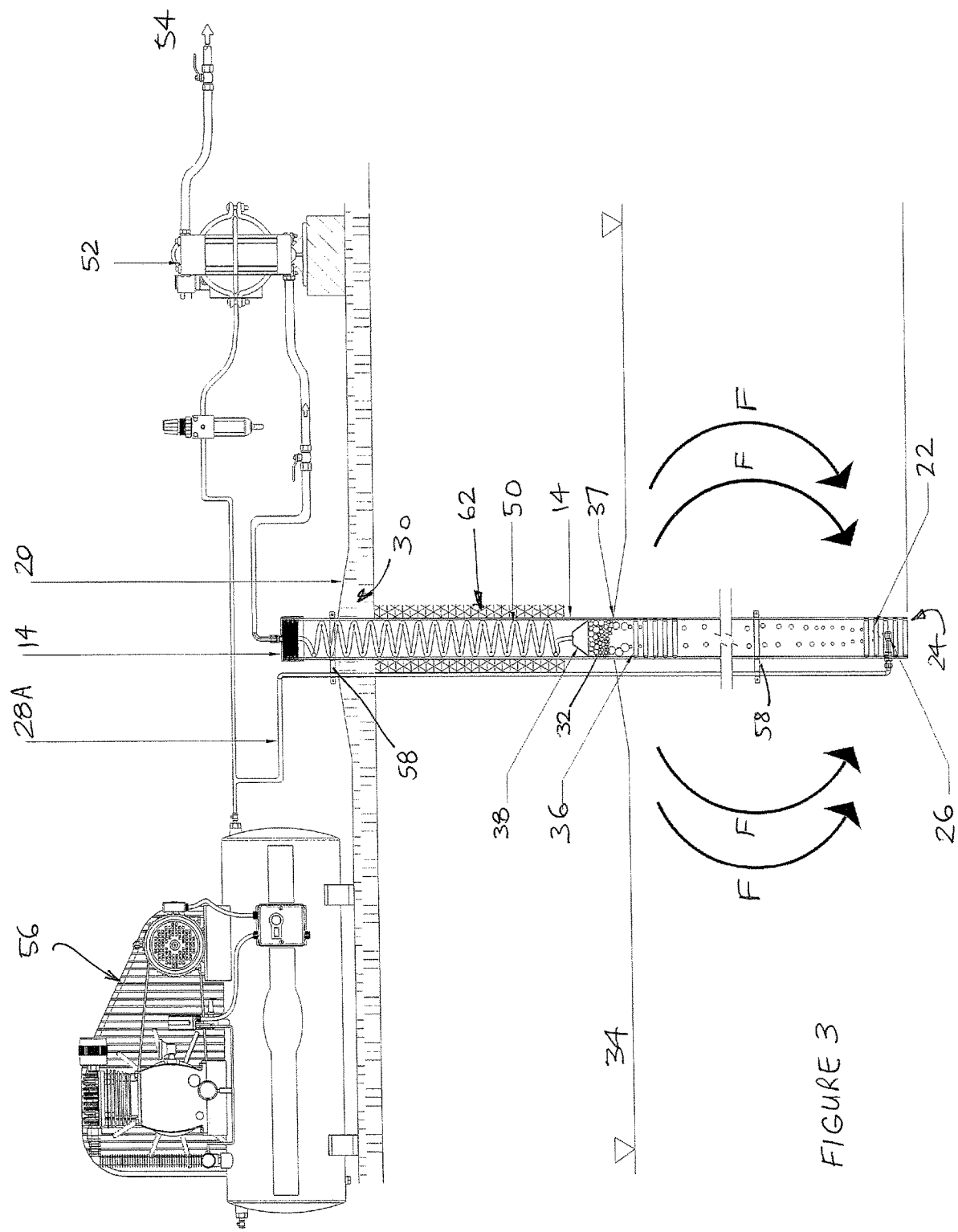
FIG. 3 shows a schematic side, sectional, elevation view of a vertical well located in a body of ground, with apparatus located in the well for use in separating an amount of a substance from groundwater that is present in the body of ground, including a froth depth regulating device which is moveable within the well, in accordance with a further embodiment of the present disclosure.

The gas supply line 28 is used to charge gas into the chamber 18 via the sparger 26, the gas typically caused to flow by means of a pump or some other source of compressed or pressurised gas which is located above the ground surface level 20 (such as a compressor 56 in FIG. 3, but which is not shown in FIG. 1). The sparger 26 is located at a height within the chamber 18 which is at or above the groundwater inlet slots 22. During use, gas is charged into the chamber 18 at a pressure and flow rate that causes bubbles to form at the sparger 26 and then, due to buoyancy, rise upward along the length of the chamber 18. Typically, the gas used is compressed air, but other gases can be used depending on the site requirements. For example, to oxygenate the groundwater, the gas introduced could be oxygen and/or ozone, perhaps mixed with air. In another way to introduced a gas, a bubble generation device may be fitted onto a pipe through which a portion of the groundwater in the chamber 18 is recirculated by pumping. The bubble generation device may be some sort of in-line gas induction device, such as a venturi restrictor, into which gas is drawn into the moving liquid flow by induction, and then the flow passage is immediately expanded, thereby causing bubbles to be formed.

Whichever way it is achieved, once the gas bubbles are formed they will rise in the chamber 18 and mix with the groundwater which has flowed into the chamber 18 via the slots 22, and filled the chamber 18. The bubbles will rise toward the upper end 30 of the chamber 18 within the well body 14, and during this residence time have had plenty of opportunity to interact with the groundwater, and for the bubbles to come into contact with organic contaminant(s) present. The flowrate of rising gas which is moving through the chamber 18 also induces groundwater to flow into the chamber 18 via the screened inlet slots 22 at the lowermost in use end 24 and upwardly towards the upper end 30.

At the upper end 30 of the chamber 18, the interaction of the bubbles and the organic contaminant in the groundwater results in the formation of a froth layer 32, which is located immediately above an interface located at the raised dynamic water level 37 (DWL) of groundwater which is located within the chamber 18. The static groundwater level 34 rises to the dynamic water level 37 once the flow of air is added during the treatment process. The dynamic water level 37 can be controlled by various means, including by the design of the chamber and outlet, however the primary control is undertaken by variations in the inlet gas delivery rate. In one example, the inlet gas delivery rate can be regulated using information from a water level interface sensor which is located within the chamber 18, where signals from such a level sensor can be sent to a control system connected to an adjustable valve on the gas delivery line.

In FIG. 1, the chamber outlet is arranged to allow groundwater to egress from the chamber 18 into the ground 12 near the uppermost end 30 of the chamber 18 and well body 14, when it is located in the ground 12. In the embodiment shown, the chamber outlet is in the form of a series of slots or slits 36, arranged in the outer wall of the well body 14 and chamber 18 at its uppermost end 30, and each slot oriented parallel to the elongate axis X-X of the well body 14 and chamber 18. These slots 36 are arranged to permit the flow of liquid therethrough in use, and are fitted with a screen or some other type of perforated cover arranged to exclude sediment and solid ground matter from entry into the chamber 18 once the well body 14 has been inserted into the ground 12, in the same manner as was previously described for the groundwater inlet slots 22. Once the groundwater level 34 in the chamber 18 reaches the uppermost slots 36, it will overflow out from the chamber 18 under gravity, and back into the surrounding ground 12 (flow arrows F).

The froth layer 32 formed above interface with the dynamic water level 37 in the chamber 18 will rise up inside the well body 14 and further into the upper end 30 thereof, past the outlet slots 36. The wettest portion of the froth layer 32 is closest to the interface which forms at the upper surface of the dynamic water level 37 of groundwater in the chamber 18, and progressively draining and becoming drier as the froth layer 32 rises further above the interface within the well body 14. Surface active material carried into the froth layer 32 includes the organic contaminant. In this way, the contaminant becomes much more concentrated in the froth layer 32 compared with its initial concentration in the groundwater in the surrounding ground 12. The froth phase is also of considerably less volume to deal with for secondary processing, compared with the groundwater.

Once the drained froth layer 32 rises up into the upper end 30 of the well body 14, a froth removal device is used to remove the froth layer 32 from the chamber 18. In the embodiment shown in FIG. 1, a froth removal device in the form of a suspended conical vacuum suction hood 38 is lowered to, and positioned at, an optimal distance above the dynamic water level 37 interface with the froth layer 32 in the well 14. Reference should now also be made to the embodiment of the well configuration shown in FIG. 3 (and to the detailed drawings of this well configuration shown in FIGS. 3A, 3B and 3C) which also uses a system with a suspended conical vacuum suction hood. (In FIG. 3 like functional parts to those shown in FIG. 1 are given like part numbers).

In FIG. 1, and in FIG. 3, the froth rises up through the conical concentration hood 38 and exits through an open outlet at the top (or apex) of the hood 38. The froth, which is now drier as a result of becoming drained by being confined by the tapering flow passage within the hood 38, then moves on to further treatment.

In the example shown in FIG. 3, the suction hood 38 is used to collapse the foamy froth concentrate and cause it to flow upward via a spiral coiled flexible hose vacuum line 50 as part of the pipe assembly 40 connected to a vacuum system operated by a pump 52. This system allows the collapsed froth to be then discharged via outlet 54 into a separate liquid concentrate receiving container, or knock-out vessel (not shown) and removed from the well body 14. The vacuum suction in the hood 38 is set to a minimum level sufficient to cause collapse of the drained froth layer 32 into a liquid form. Experiments have shown that the location of the vacuum suction hood 38 (acting as a froth depth regulation device) controls the amount of groundwater in the froth layer 32, which therefore influences the concentration of the contaminant substance achieved in the froth layer 32.

A further example is shown in FIG. 1B, which in all respects is similar to the embodiment shown in FIG. 1 (and like functional parts given like part numbers) with the exception of the vacuum suction hood 38B. In this example, the inlet gas delivery rate into the chamber 18 can be regulated using information from a conductivity meter, or a water level sensor 41, which is located at or below the vacuum suction hood 38B (or in other versions can be positioned in the flexible hose and pipe assembly 40). Signals from the water level sensor 41 provide information about the groundwater content of the froth layer 32, and can be sent to a control system connected to an adjustable valve on the gas delivery line. In such an example, if the froth layer 32 is insufficiently dry, the flow of introduced gas into the chamber may need to be decreased, because there is too much groundwater being moved in the froth layer 32 and the process is not concentrating the contaminant sufficiently. Conversely if there is little or no production of froth, the flow of introduced gas into the chamber 18 may need to be increased. In such instance, the vacuum suction hood 38B is arranged at a fixed location within the chamber 18, and it is the location of the interface at the dynamic water level 37 which is responsive to changes in the flow of the introduced gas. The control devices themselves can be arranged either above ground surface level 20, or also positioned in the surrounding ground 12 adjacent the upper end 30 of the well body 14 and chamber 18.

The collapsed froth concentrate containing the organic contaminant then is passed for further treatment for removal of the contaminant. Usually absorption (that is, capture using activated carbon, clay, or ion exchange resins) of the organic material onto a substrate is preferred and the substrate can then be regenerated or safely destroyed. Other forms of secondary treatment such as filtration (using reverse osmosis membranes) and biofilters are possible to produce something even more concentrated for subsequent destruction.

Figure 2:
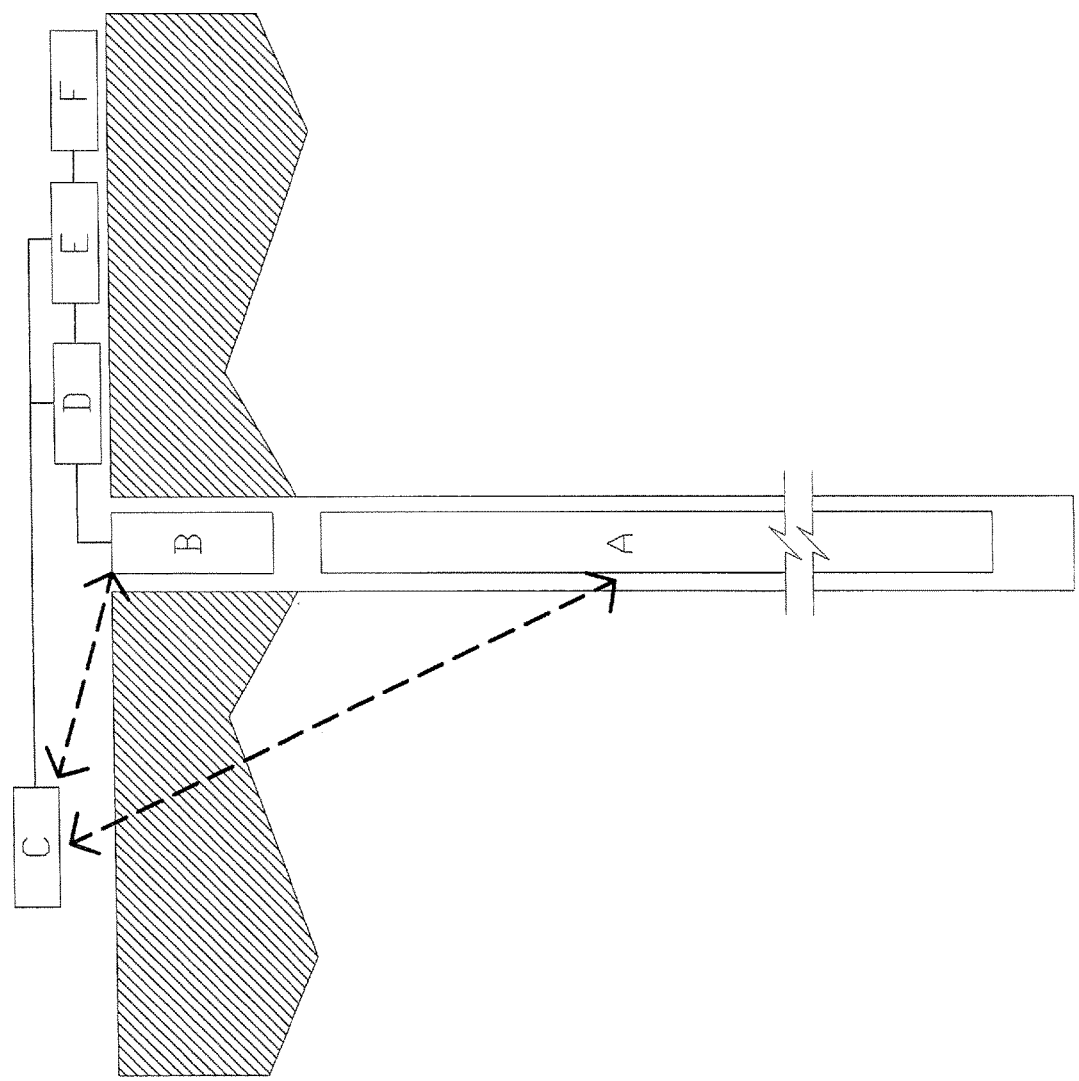
FIG. 2 shows a schematic side, sectional, elevation view of the various process steps or stages of a method used for separating an amount of a substance from groundwater that is present in a well located in a body of ground, in accordance with a further embodiment of the present disclosure.

Referring to FIG. 2, the process is illustrated schematically in which A is the groundwater well chamber and air sparging zone; B is the froth recovery zone; C is a control system (to monitor the air inlet sparging, the froth layer formation and the froth capture and collapse equipment); D is a froth capture and collapse stage; E is a further froth concentration stage; and F is a collapsed froth/foam destruction system (which may actually be located elsewhere offsite). The process operation will now be described in greater detail.

In operation, the groundwater well 10 can be used to remove a substance from the surrounding ground 12 outside of the well 10, where the substance can be an organic contaminant. The present disclosure is mainly concerned with the removal of an organic substance known generally as a perfluoroalkyl substance or a polyfluoroalkyl substance (PFAS). This can include one or more of the group comprising: perfluorooctane sulfonate (PFOS); perfluorooctanoic acid (PFOA); perfluoro-n-hexane sulfonic acid, (PFHxS); poly fluorinated carboxylic acids, alkyl sulfonates and alkyl sulfonamido compounds; and fluorotelemeric compounds, each having differing carbon chain lengths; and including precursors of these. The main substances of interest from this group are perfluorooctane sulfonate (PFOS) and perfluorooctanoic acid (PFOA) which can persist in groundwater for a long time. These substances have some surface activity, meaning that they can have the ability to form a stable froth when aerated in liquid.

In practice, a hole is drilled to form a groundwater well 10, and then a groundwater well column 16 is inserted into the groundwater well 10 and packed into the surrounding ground 12 (for example using a gravel packing, item 62 in FIG. 3), so that the surrounding ground 12 is in close contact with the exterior of the well body 14, and so that the upper end 30 of the well body 14, and its interior chamber 18, is accessible from above the ground surface level 20. The well body 14 can be formed of a number of individual elongate sections joined end to end, and positioned to any required depth into the surrounding ground 12 to be able to access the water table and below the contaminated groundwater level 34. When in this position, the groundwater can access the well body 14 interior chamber 18 via the lowermost chamber inlet slots 22, as has been previously described, and the interior chamber 18 will fill with groundwater (rather than with solids).

The gas introduction device in the form of a sparger or bubbler 26 is then located in the chamber 18, with the sparger 26 located near to the lowermost end 24 in use, but at a height which is at or above the inlet slots 22 to the chamber 18. Air is then charged into the chamber 18 via the gas supply line 28. As gas is charged into the chamber 18 and bubbles form at the sparger 26, the bubbles rise upward over length of the chamber 18 and accumulate in the froth layer 32 located above the interface which forms at the upper surface of the dynamic water level 37.

When the collapsed froth concentrate containing the organic contaminant(s) has been discharged into a separate liquid concentrate receiving container, or knock-out vessel, it is then passed for secondary treatment involving either further concentration, destruction or removal of the contaminant. Further concentration of the collapsed froth may be undertaken using a similar process to that used for the initial separation step and may be conducted in above ground treatment apparatus where the collapsed froth is subject to further gas sparging and froth concentration. Multiple concentration steps may be undertaken using this approach to minimise the volume of fluids requiring treatment. Residual fluids produced during the concentration steps may be re-introduced to the start of the process or, where appropriate, released back into the groundwater system.

During secondary treatment, a final concentrate liquid is treated for removal of the concentrated organic contaminant (s), for example by absorption onto a solid or semisolid substrates (using activated carbon, clay, ion exchange resins or other organic materials), or by filtration (using reverse osmosis membranes to filter and increase the concentration of contaminant(s) and reduce treatment volumes). Once the absorption capacity of a substrate is exceeded it can then be regenerated or destroyed.

In some examples, the secondary treatment apparatus may be housed within the upper portion of the chamber 18, so that the groundwater can remain below ground during decontamination, and be able to be returned to that same body of ground following decontamination.

Figure 4B:
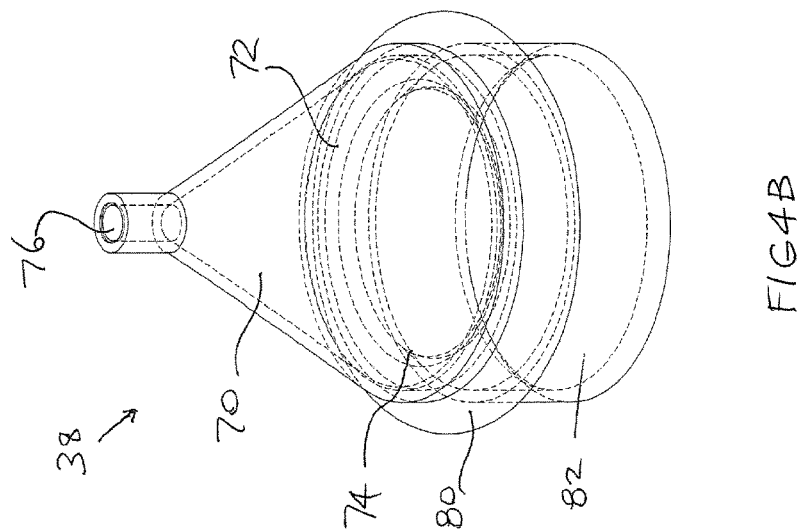
FIG. 4B shows a schematic side, sectional, elevation view of the component part of FIG. 4A when viewed along section line A-A.
Figure 4A:
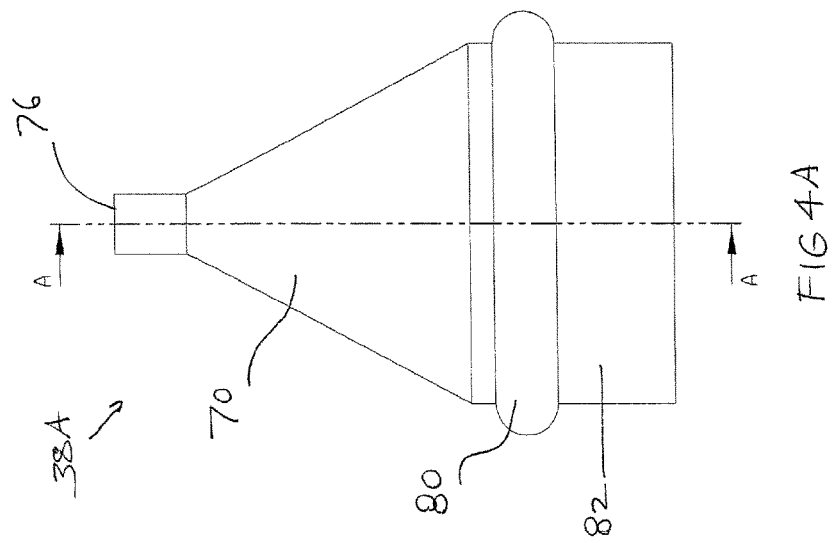
FIG. 4A shows a schematic, side elevation view of a moveable froth depth regulating device, being a component part for location in a ground well, in use for separating an amount of a substance from groundwater that is present in the body of ground, in accordance with a further embodiment of the present disclosure.
Figure 4C:
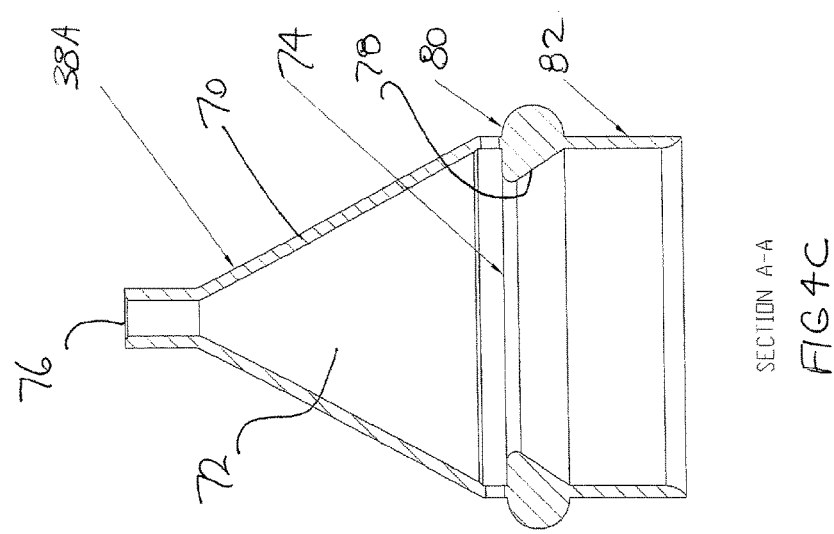
FIG. 4C shows a schematic perspective view of the component part of FIG. 4A.

Referring now to FIG. 1A, there is another embodiment of a froth removal device in the form of a conical vacuum suction hood 38A which is positioned above the dynamic water level 37 interface with the froth layer 32 in the well 14. Reference should now also be made to detailed drawings of this suction hood 38A as shown in FIGS. 4A, 4B and 4C. In FIG. 1A, like functional parts to those shown in FIG. 1 are given like part numbers.

The apparatus shown in FIG. 1A is in all respects is similar to the embodiment shown in FIG. 1, with the exception of the vacuum suction hood 38A. In this example, the hood 38A functions as a froth depth regulation device because it is moveable up and down within the chamber 18 in response to movement of the location of the dynamic water interface 37, because the hood 38A is buoyant and sits at that water interface. No matter what the dynamic water level 37 may be in the chamber, the suction hood 38A can maintain its vertical position relative to that froth layer interface. No discrete step of raising or lowering of the hood within the chamber 18 is required to move the vertical position of the hood in relation to the froth interface (as is the case for the embodiment 38 of FIGS. 1 and 3), and no changing of the gas flow rate is required to move the vertical position of the froth interface in relation to a hood with a fixed vertical position hood in the chamber 18 (as is the case for the embodiment 38B of FIG. 1B).

Referring now to FIGS. 4A, 4B and 4C, the buoyant hood 38A has a generally conical shaped main body 70 which is hollow. The cone-shaped cavity 72 therewithin has a circular open-ended mouth 74 which in use is oriented downwardly to face the rising froth layer 32 above the dynamic water level interface 37 in the well chamber 18. The mouth 74 receives the froth layer 32 and then, because of the narrowing cross-sectional width of the cone-shaped cavity 72, the rising froth becomes confined and some of the carryover groundwater is crowded, drained and excluded by gravity to fall back into the chamber 18. The remaining froth is then removed for further processing via the apex hole 76, for example by suction withdrawal. Other internal ribs and protruding shapes 78 within the hollow cone-shaped cavity can also facilitate froth crowding and drainage.

The conical main body 70 has an annular, circumferential buoyancy ring 80 arranged therearound which allows the hood 38A to be moveably vertically positionable in use within the elongate chamber 18 and to float at the interface, in a configuration which is arranged to provide an optimal distance between the mouth 74 and that interface. There is also a circumferential skirt 82 which depends from the main body 70 and in use extends downwardly into the groundwater located in the elongate chamber 18 below the froth layer interface. With reference to FIG. 1A, if the dynamic water level 37 in the chamber 18 falls into a region near to the groundwater egress slots 36 located in the wall of the chamber 18, the circumferential skirt 82 will align with and block those slots 36, so that the froth layer 32 itself does not inadvertently become drawn out into the surrounding ground 12 by the egress of other groundwater from the chamber 18.

Figure 5B:
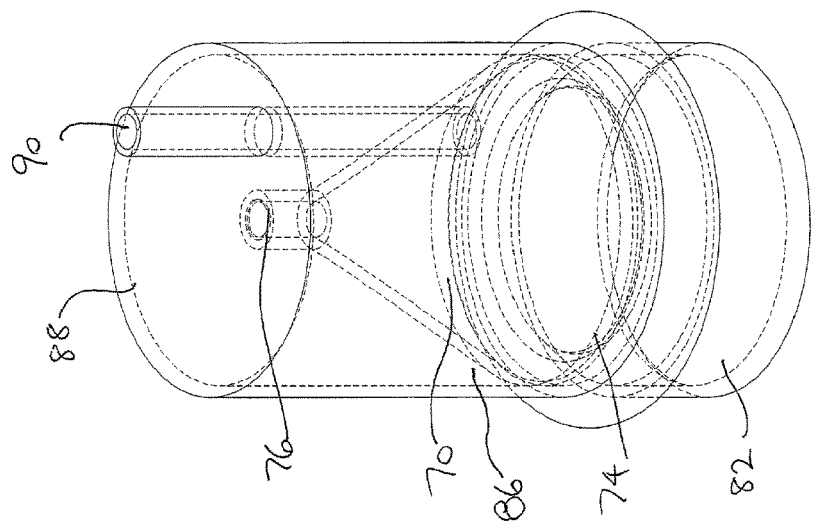
FIG. 5B shows a schematic side, sectional, elevation view of the component part of FIG. 5A when viewed along section line A-A.
Figure 5A:
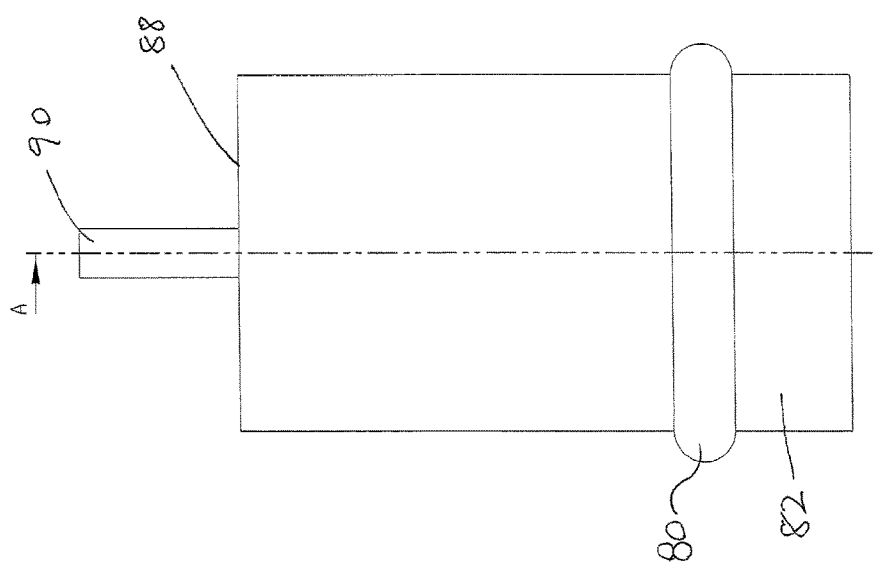
FIG. 5A shows a schematic, side elevation view of a moveable froth depth regulating device, being a component part for location in a ground well, in use for separating an amount of a substance from groundwater that is present in the body of ground, in accordance with a further embodiment of the present disclosure.
Figure 5C:
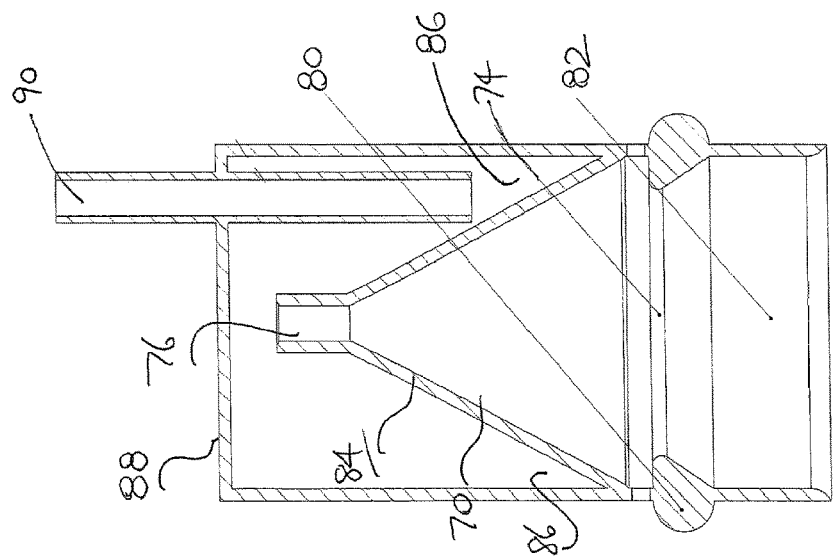
FIG. 5C shows a schematic, perspective view of the component part of FIG. 5A.

Referring now to FIGS. 5A, 5B and 5C, the related embodiment of a buoyant hood 38C is shown which is in all respects the same as the embodiment shown in FIGS. 4A, 4B and 4C, the uppermost apex hole 76 extends to a region located on the upper in use surface 84 of the conical body 70 which is arranged as an annular shaped reservoir 86 for retaining an amount of the collapsed froth. The reservoir 86 is also enclosed by a top cover 88 to prevent access from ground level 20 above the well 14. There is a pipe outlet 90 located in that covered reservoir 86 to allow intermittent pumping removal of collected froth concentrate as required.

Figure 6:
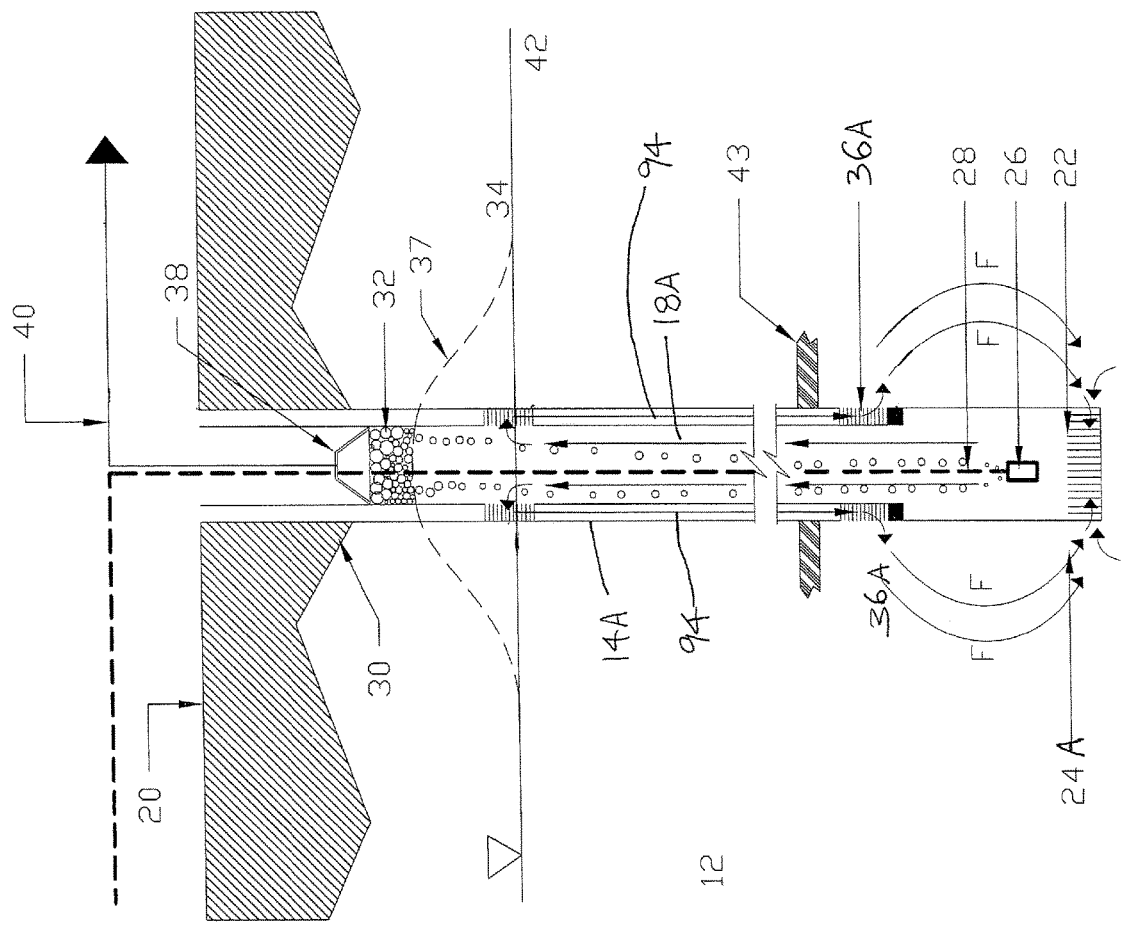
FIG. 6 shows a schematic side, sectional, elevation view of a vertical well located in a body of ground, with apparatus located in the well for use in separating an amount of a substance from groundwater that is present in the body of ground, including a froth depth regulating device which is moveable within the well, and a well casing having a concentric annular fluid conduit arranged about at least part of its central elongate chamber, in accordance with a further embodiment of the present disclosure.

Referring now to the embodiment disclosed in FIG. 6, there is a well body 14A is in the form of an elongate, cylindrical column having an interior chamber 18A. The well body 14A is circular in cross-section and is positioned within the ground 12, below the ground surface level 20. The interior chamber 18A functions in all respects the same as the chamber 18 in any of the previously described embodiments, for example FIG. 1. However, the outlets 36A arranged in use for egress of groundwater from a position which is higher up in the interior chamber 18A than the first end 24A, are not in fluid communication with the ground 12 outside the well body 14A at that said region, but instead, in use the groundwater flowing out of the interior chamber 18A passes via an annular, circumferential fluid chamber 94 which is arranged concentrically around the outside of the interior chamber 18A, so that the groundwater flows downwardly in that circumferential chamber 94 and passes back into fluid communication with the ground 12 located outside of the well body 14A via the slot outlets 36A at a depth which is now closer to the first end 24A, but still located vertically above the fluid entry slots 22.

In some further embodiments, the interior chamber 18A may contain one or more additional chambers which are separated from each other by annular spacings which may be further divided and interconnected by the use of hydraulic packers and screened intervals within the chamber walls. Using multi-chamber wells allows the focussed treatment of specific zones within the groundwater column which may be intersected, and it also allows for the treatment of semi and confined aquifers. These aquifers have impervious or semi-pervious layers 43 which restrict or prevent the more widespread flow paths F shown in FIG. 1 from developing.

EXPERIMENTAL RESULTS

Experimental results have been produced by the inventors using both laboratory (batch) and a pilot-scale (continuous) configuration of the new apparatus and method disclosed herein, to observe any beneficial outcomes during the operation of the process of concentrating PFAS from groundwater samples.

A laboratory froth concentration system to demonstrate the froth separation method was assembled in which field samples of contaminated groundwater were added to a treatment cylinder (1L capacity polypropylene measuring cylinder). An air diffuser was placed at the bottom of the treatment cylinder. Flexible tube (5 mm OD polyethylene tube) was run from an air supply through a rotameter (flow meter 5 L/min capacity) to an air diffuser. A capillary line (3 mm OD polyethylene tube) extended into the treatment vessel and was connected to a graduated syringe (10 mL capacity polyethylene) for doing progress sampling of water during treatment.

During the experiments, air was supplied using either an air pump (4.5 L/min capacity) an air compressor (60 L/min capacity) or regulated compressed air cylinder. A series of commercially available air diffusers were assessed for performance based on bubble size and foam generation at varying air flow rates.

Activation of the air diffuser released air bubbles which rose through the water column, and a foam formed at the top of the water column. A foam harvesting system consisting of a flexible tubing (12 mm OD polyethylene) connected to an inverted conical funnel which was placed under vacuum. When vacuum was applied, foam was withdrawn (harvested) from the top of the treatment cylinder, above the groundwater interface, and foam concentrate was collected as a liquid following collapse of the foam in a separate flask. In the experiments, the inverted funnel was progressively lowered into the foamy head layer, which was withdrawn into the receiving flask under vacuum.

Experiments were also conducted in a scaled-up column (clear PVC, 50 mm diameter, 2.5 m height) located in the laboratory. All tests were run at room temperature (approx. 21 C). The main physical parameters investigated were air flow rate, air pressure, bubble size, water height (in column) and foam height (in column). The analytical parameters investigated were priority PFAS concentrations in treated water and priority PFAS concentrations in harvested foam concentrate. The priority PFAS compounds were PFOS and PFOA. The water used to conduct experiments was obtained from a contaminated site adjacent to an airfield.

Figure 7:
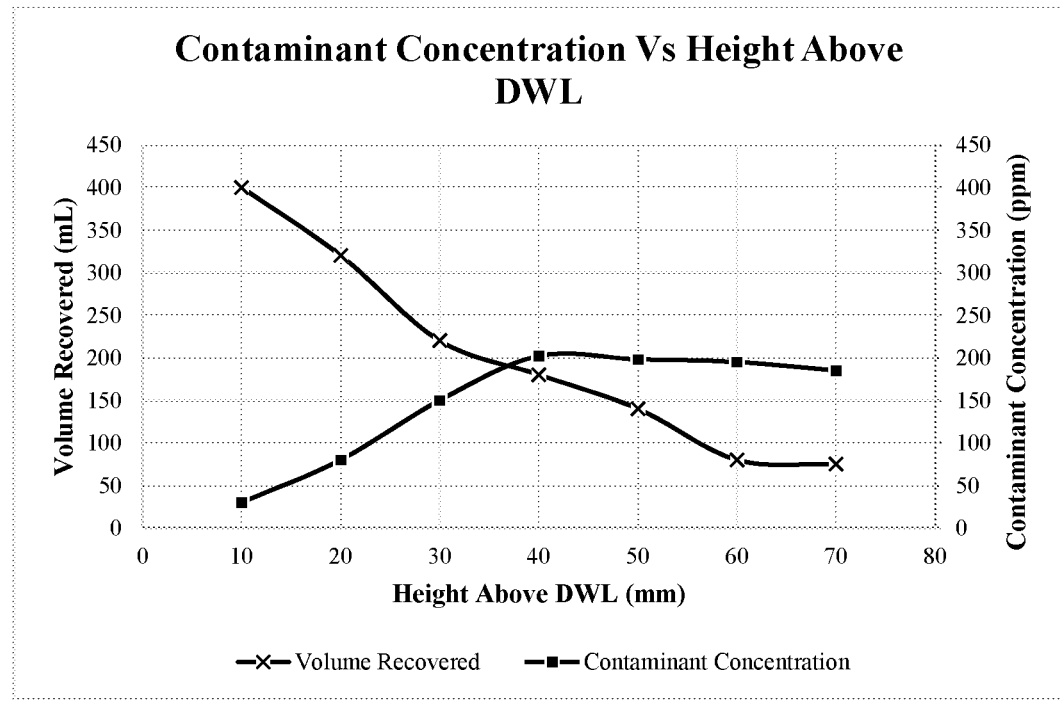
FIG. 7 is a graph illustrating the experimental results of contamination concentration in volume of froth layer as a function of height above the DWL.
Figure 8:
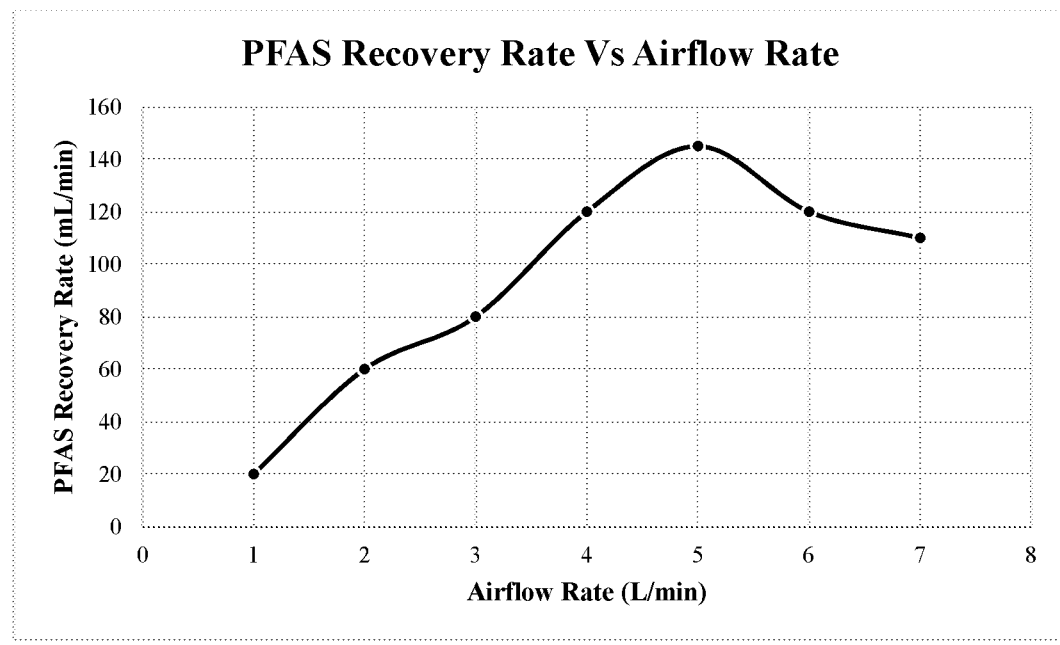
FIG. 8 is a graph illustrating experimental results of PFAS recovery as a function of air flow rate.

The experiments to treat contaminated groundwater by foam generation and separation showed considerable promise. Both PFOS and PFOA were separated from water by aeration and foam generation. There were also important improvements in the concentration of PFAS compounds in the recovered froth concentrate, in some experiments by a factor of between 100 and 200 times original concentration. Some results are now presented in the graphs shown in FIG. 7 and FIG. 8.

Measurements were made of the concentration of PFAS contaminant in the froth layer, as well as the volume of froth layer which was collected, as a function of the height of the inlet of a froth depth regulation device (the inverted funnel). The experiments sought to define an optimum froth layer depth above the interface (the dynamic water level, "DWL") and its influence on the groundwater content in the froth layer, which determines the concentration of the substance therein.

The extent to which the inverted funnel was located into the foam layer was found to be determinative of the concentration of PFAS in the foam concentrate. When the froth depth regulation device was too close to the DWL, larger volumes of groundwater were collected, and the concentration of contaminant was low. As the froth depth regulation device was moved further away from the DWL, the concentration of contaminant increased until a certain position was reached (>40 mm above DWL), whereupon the concentration of contaminant in the foam layer did not increase anymore, even as the froth depth regulation device was moved further away from the DWL, even though the quantity of froth extracted was progressively decreasing. These results showed that, for this set of conditions, there is an optimum location away from the DWL that the froth depth regulation device should exceed, to maximise the concentrating effect of the process.

Measurements were made of the recovery of PFAS contaminant in the froth layer, as a function of the air flow rate through the contaminated groundwater. The experiments sought to define the influence of airflow on the groundwater content in the froth layer, and how it determines the concentration of the substance therein.

The airflow was found to be determinative of the rate of recovery of PFAS in the foam concentrate. However, when the airflow rate exceeded a certain level, larger volumes of groundwater were collected in the froth layer, and the rate of recovery of PFAS into the froth layer started to decrease as the conditions in the chamber became turbulent and the froth layer formation was increasingly disrupted (>5 L/min air). These results showed that, for this set of conditions, to maximise the concentrating effect of the process, there is an optimum operating range of airflow rate which should not be exceeded.

While the system can be operated in a batch mode, in a continuous version of the groundwater treatment process as shown in, for example FIG. 1, the groundwater flows out of the chamber 18 via the slots 36 arranged in the outer wall of the well body 14 at its upper end 30, and the upward flow of bubbled gas induces an upwardly moving current of flow of groundwater within the chamber 18, which then circulates back through the surrounding ground 12. As the concentrated organic contaminant is removed from the chamber 18 by the rising froth formation process, and the froth layer 32 then removed from the upper end 30 of the chamber 18 by further processes, the groundwater flow exiting the chamber 18 of the well body 14 at its upper end 30 has therefore been depleted of most of its organic contaminant. This relatively cleaner groundwater then acts to flush the body of surrounding ground 12 at the exterior of the well body 14 with cleaner water, and to elutriate further contaminant, as the water flows downward under gravity in the zone outside the well body 14 (flow arrows F). This return groundwater carrying more elutriated contaminant is then subsequently drawn towards the chamber inlet slots 22, located near the lowermost end 24 of the well body 14, as shown in FIG. 1, and so the process repeats itself and the well body 14 is replenished with contaminated groundwater.

A plurality of such continuously operating groundwater well bodies 14, when spaced apart from one another and arranged in an array across an area of contaminated ground 12, can be operated simultaneously to induce an upwardly moving current of flow of groundwater within each chamber 18, which then circulates back through the surrounding ground 12 located outside of each well body 14 after having been froth-depleted of its organic contaminant. The use of multiple well bodies 14 can act to flush the ground 12 and to elutriate contaminant over an extended period of time. The well bodies 14 simply need to be radially spaced apart from one another at the ground surface level 20, and to sufficient depth, so that the area of influence of the circulation of groundwater outside of each well body 14 is overlapping.

If automated, these well bodies 14 can operate continuously for long periods. A control system (Item C in FIG. 2) can be implemented to balance air inlet and well performance, so as to optimise production of dry froth of the highest possible PFAS concentration. The froth separation of a plume of PFAS contamination from groundwater using such well bodies 14 can be used to clear soil and its underlying groundwater table of contamination.

From the above, it will be understood that at least some embodiments of apparatus and method in accordance with the invention provide one or more of the following advantages, in comparison to conventional treatment methods:
  A lower volume of PFAS concentrated liquor is produced for secondary treatment steps;
  A smaller secondary treatment plant is required;
  A lower overall treatment time is achieved compared to standard pump and treat systems;
  Simultaneous treatment across a large contaminated area is feasible, to any depth required to penetrate contaminated layers of ground;
  A smaller volume of concentrated liquor means that use of a complete destruction process (not disposal to landfill) is feasible; and
  Ability to extract contaminant rather than to perform in-situ chemical treatment, which may not work (or be reversible), and may not reach all levels of groundwater contamination.
  The apparatus can be configured for use in many different types of remediation situations, including source zones, hotspots, migration pathways and as a way to provide a protective barrier around environmentally-sensitive receptors.
  A physical separation process avoids the use of potentially hazardous chemicals as part of in-situ chemical treatment approaches, and produces no by-products or wastes.

Throughout this specification, the words "froth" and "foam" may be used interchangeably but are taken to mean the same thing, essentially comprising a wet liquid concentrate having low quantities of particulate materials or concentrated organic contaminants, and extracted by various designs of devices which aim to provide as much control and reduction of the groundwater content in the froth layer as possible.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

The reference in this specification to any prior publication or information is not, and should not be taken as, an acknowledgement or admission or any form of suggestion that the prior publication or information forms part of the common general knowledge in the field of endeavor to which this specification relates.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

In addition, the foregoing describes only some embodiments of the invention(s), and alterations, modifications, additions and/or changes can be made thereto without departing from the scope and spirit of the disclosed embodiments, the embodiments being illustrative and not restrictive.

Furthermore, invention(s) have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention(s). Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. Apparatus for separating an amount of a substance from groundwater that is present in a body of ground, the apparatus comprising:
  an elongate chamber defined by a cylindrical side wall, the chamber having an inlet opening in the side wall which is arranged in use to admit groundwater from the ground into the chamber at a region located near a first end of the chamber, said inlet opening also comprising a screen or a perforated cover which is arranged to act as a barrier to exclude sediment and solid ground matter from accessing the chamber during flow movement of the groundwater thereinto;
  a gas introduction device located in said region of the chamber near the first end which in use admits gas into the chamber, the introduced gas for inducing groundwater to flow from said region near the first end of the chamber toward a second end thereof, for producing a froth layer over a cross-sectional area of the chamber that is formed at, and which rises above an interface with the flow of groundwater and the flow of introduced gas, the froth layer including groundwater and a concentrated amount of the substance compared with its initial concentration in the groundwater in the chamber;
  a froth depth regulation device which is positioned within the chamber and which is arranged in use to contain the froth layer near the second end of the chamber, and to control the groundwater content of the froth layer to influence the concentration of the substance therein, wherein said froth depth regulation device;

maintains the depth of the froth above the interface by being moveably vertically positionable within the chamber in response to the location of the interface in use; and comprises a main body including a cavity having an open mouth which is arranged in use to face downwardly into the chamber, with either an outer circumference of the open mouth or an exterior surface of the main body being sized so as to have a close facing relationship with the cylindrical side wall, such that the froth layer is substantially directed into and received by the open mouth, to confine the cross-sectional area of the froth layer in the chamber, resulting in drainage of groundwater from said froth layer;

a froth layer removal device, in use for removing at least some of the drained froth layer received by said open mouth from the second end of the chamber, via an uppermost in use exit opening in the main body of the froth depth regulation device; and the chamber having an outlet opening in the side wall which is arranged in use for egress of groundwater therefrom at a region closer to said second end of the chamber.

2. Apparatus as claimed in claim 1, wherein the said outlet from the chamber comprises a fluid conduit extending therefrom arranged in use to carry a flow of groundwater for discharge into the ground.

3. Apparatus as claimed in claim 2, wherein the fluid conduit comprises a concentric annular cylinder arranged around the exterior wall of the elongate chamber.

4. Apparatus as claimed in claim 1, wherein in use the froth layer is located above the outlet.

5. Apparatus as claimed in claim 1 wherein the gas introduction device is positioned in use in the chamber at or above the height of the inlet.

6. Apparatus as claimed in claim 1, wherein the flow of introduced gas into the chamber is controlled by a flow controller and an inlet valve on a gas delivery line, responsive in use to a measurement of one of the group comprising: the groundwater content of the froth layer; and the location of the interface.

7. Apparatus as claimed in claim 1, wherein a bubble generation device is located prior to or at the point when the flow of introduced gas enters the groundwater located in the chamber.

8. Apparatus as claimed in claim 1, wherein at least some of the drained froth layer is collapsed during removal from the second end of the chamber, and prior to a secondary treatment step.

9. Apparatus as claimed in claim 1, wherein the froth layer removal device includes mechanical apparatus from the group comprising: a foam breaker, a vacuum extraction device, and a froth extraction head.

10. Apparatus as claimed in claim 8, further comprising a secondary treatment device in use for treating the collapsed froth layer for removal of the concentrated substance, wherein the treatment device includes at least one of the group comprising: an absorption bed (using activated carbon, clay, or ion exchange resins), a filtration apparatus (using reverse osmosis membranes); and a froth flotation cell to produce a froth layer comprising a further concentrated amount of the substance.

11. Apparatus as claimed in claim 1, wherein the main body is fitted with one or more buoyancy elements which cause the device to float at the interface.

12. Apparatus as claimed in claim 1, wherein the cavity has an internal shape which tapers inwardly when moving from the region of the open mouth toward the exit opening to facilitate froth layer crowding and drainage or collapse.

13. Apparatus as claimed in claim 1, wherein at the region of the open mouth there is a circumferential skirt which depends from the main body and in use extends downwardly into the groundwater in the elongate chamber below the froth layer interface, and arranged of a sufficient length to align with, and block the outlet in the wall of the elongate chamber used for egress of groundwater into the ground from the chamber, in operating circumstances where the interface is vertically aligned with said outlet.

14. Apparatus as claimed in claim 13, wherein the skirt has a cross-sectional profile which tapers inwardly when moving from an outermost rim thereof toward the region of the open mouth where the skirt depends from the main body, to facilitate froth layer crowding and drainage or collapse.

15. Apparatus as claimed in claim 1, wherein in use when the chamber is at least partially located within the body of ground, the outlet is in fluid communication with ground which is located outside the chamber at the region closer to said second end of the chamber.

16. Apparatus as claimed in claim 15, wherein the outlet opening also comprises a screen or a perforated cover which is arranged to act as a barrier to exclude solid ground matter from accessing the chamber during movement of the groundwater.

17. Apparatus as claimed in claim 1, wherein in use when the chamber is at least partially located within the body of ground, the outlet is not in fluid communication with the ground which is located outside the chamber at the region closer to the second end of the chamber, but instead is in fluid communication with the ground which is located around the chamber at the region closer to the first end thereof.

18. Apparatus as claimed in claim 17, wherein the outlet opening also comprises a screen or a perforated cover which is arranged to act as a barrier to exclude solid ground matter from accessing the chamber during movement of the groundwater.

* * * * *